(12) United States Patent
Hosabettu

(10) Patent No.: US 10,402,491 B2
(45) Date of Patent: Sep. 3, 2019

(54) SYSTEM AND METHOD FOR CREATING AND BUILDING A DOMAIN DICTIONARY

(71) Applicant: Wipro Limited, Bangalore (IN)

(72) Inventor: Raghavendra Hosabettu, Bangalore (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/429,536

(22) Filed: Feb. 10, 2017

(65) Prior Publication Data
US 2018/0173696 A1 Jun. 21, 2018

(30) Foreign Application Priority Data
Dec. 21, 2016 (IN) .............................. 201641043708

(51) Int. Cl.
*G06F 17/27* (2006.01)
*G06F 16/36* (2019.01)

(52) U.S. Cl.
CPC .......... *G06F 17/2735* (2013.01); *G06F 16/36* (2019.01); *G06F 17/2785* (2013.01)

(58) Field of Classification Search
CPC . G06F 17/2735; G06F 17/271; G06F 17/2785
USPC ...................................................... 704/1–504
See application file for complete search history.

(56) References Cited

U.S. PATENT DOCUMENTS

| 5,873,056 | A | * | 2/1999 | Liddy | .................. | G06F 17/274 |
| | | | | | | 704/9 |
| 6,137,911 | A | * | 10/2000 | Zhilyaev | ............... | G06F 16/353 |
| | | | | | | 382/225 |
| 8,296,130 | B2 | * | 10/2012 | Spears | ............... | G06F 16/9535 |
| | | | | | | 704/9 |
| 8,463,806 | B2 | | 6/2013 | Loritz et al. | | |
| 8,612,208 | B2 | | 12/2013 | Cooper et al. | | |
| 8,949,198 | B2 | | 2/2015 | Sarshar et al. | | |
| 9,081,852 | B2 | | 7/2015 | Marvit et al. | | |
| 9,201,957 | B2 | | 12/2015 | Turdakov et al. | | |
| 9,251,133 | B2 | | 2/2016 | Chen et al. | | |

(Continued)

OTHER PUBLICATIONS

Enrique Alfonseca. et al . . . "An Unsupetvised Method for General Named Entity Recognition and Automated Concept Discowty", pp. 1-8.*

(Continued)

*Primary Examiner* — Marcus T Riley
(74) *Attorney, Agent, or Firm* — Finnegan, Henderson, Farabow, Garrett & Dunner, LLP

(57) ABSTRACT

This disclosure relates to system and method for dynamically creating and building a domain dictionary. In one embodiment, the method comprises computing a syntactic similarity score, a usage similarity score, and a contextual similarity score for an input word with respect to each of a plurality of domain specific words in each of a plurality of existing domains. The method further comprises computing a weighted overall similarity score for the input word with respect to each of the plurality of domain specific words in each of the plurality of existing domains based on the syntactic similarity score, the usage similarity score, and the contextual similarity score. The method further comprises determining belongingness of the input word to each of the plurality of existing domains based on the weighted overall similarity score.

20 Claims, 6 Drawing Sheets

(56) References Cited

U.S. PATENT DOCUMENTS

| | | | |
|---|---|---|---|
| 2004/0215449 A1* | 10/2004 | Roy | G10L 15/08 704/211 |
| 2008/0126319 A1* | 5/2008 | Bukai | G06F 16/35 |
| 2010/0281025 A1 | 11/2010 | Tsatsou et al. | |
| 2011/0191105 A1* | 8/2011 | Spears | G06F 16/9535 704/251 |
| 2011/0202334 A1* | 8/2011 | Abir | G06F 17/2809 704/4 |
| 2011/0270883 A1* | 11/2011 | Bukai | G06F 16/35 707/777 |
| 2014/0180868 A1 | 6/2014 | Kanigsberg et al. | |
| 2017/0277736 A1 | 9/2017 | Sharma et al. | |
| 2018/0173696 A1* | 6/2018 | Hosabettu | G06F 17/2735 |

OTHER PUBLICATIONS

Sunkanya Ray et al., 'Domain Based Ontology and Automat'd Text Categorization Based on improved Term Frequency—inverst; Document Frequency1', f.J. Modern Education and Computer Science, May 2012, 4. pp. 28-35.*

Sukanya Ray, Domain Based Ontology and Automated Text Categorization Based on Improved Term Frequency—Inverse Document Frequency, May 2012, I.J. Modern Education and Computer Science, vol. 4, pp. 28-35 (Year: 2012).*

Sunkanya Ray et al., "Domain Based Ontology and Automated Text Categorization Based on Improved Term Frequency—Inverse Document Frequency", *I.J. Modern Education and Computer Science*, May 2012, 4, pp. 28-35.

Viral Parekh et al., "Mining Domain Specific Texts and Glossaries to Evaluate and Enrich Domain Ontologies", 7 pages.

Martin S. Lacher et al., "Facilitating the exchange of explicit knowledge through ontology mappings", *FLAIRS-01 Proceedings*, 2001, pp. 305-309.

Phillipp Cimiano et al., "Concenptual Knowledge Processing with Formal Cencept Analysis and Ontologies", *SpringerLink*, Abstract, Lecture Notes in Computer Science, vol. 2961, 6 pages.

Enrique Alfonseca et al., "An Unsupervised Method for General Named Entity Recognition and Automated Concept Discovery", pp. 1-8.

* cited by examiner

FIG. 6

SYSTEM AND METHOD FOR CREATING AND BUILDING A DOMAIN DICTIONARY

TECHNICAL FIELD

This disclosure relates generally to information processing, and more particularly to system and method for dynamically creating and building a domain dictionary.

BACKGROUND

In an increasingly digital world, there is a massive growth of information that needs to processed or analyzed for various purposes. Thus, the evolving information acquired from various channels (e.g., web page, documents, etc.) may be employed to construct various knowledge bases. Additionally, evolving information needs to be continuously coalesced without losing semantic correctness derived from context irrespective of source and other constraints like time difference, location, etc.

However, a knowledge base may hold a large amount of information without being useful as finding relevant information may be cumbersome and inefficient. Thus, the knowledge base in its current form needs to be transformed into manifestations to be useful for various purposes. For example, if the knowledge base is manifested into different domain specific dictionaries, it may be useful in multiple solutions such as document classification, machine translation, and other natural language processing (NLP) tasks.

SUMMARY

In one embodiment, a method for creating and building a domain dictionary is disclosed. In one example, the method comprises computing a syntactic similarity score, a usage similarity score, and a contextual similarity score for an input word with respect to each of a plurality of domain specific words in each of a plurality of existing domains. The method further comprises computing a weighted overall similarity score for the input word with respect to each of the plurality of domain specific words in each of the plurality of existing domains based on the syntactic similarity score, the usage similarity score, and the contextual similarity score. The method further comprises determining belongingness of the input word to each of the plurality of existing domains based on the weighted overall similarity score.

In one embodiment, a system for creating and building a domain dictionary is disclosed. In one example, the system comprises at least one processor and a memory communicatively coupled to the at least one processor. The memory stores processor-executable instructions, which, on execution, cause the processor to compute a syntactic similarity score, a usage similarity score, and a contextual similarity score for an input word with respect to each of a plurality of domain specific words in each of a plurality of existing domains. The processor-executable instructions, on execution, further cause the processor to compute a weighted overall similarity score for the input word with respect to each of the plurality of domain specific words in each of the plurality of existing domains based on the syntactic similarity score, the usage similarity score, and the contextual similarity score. The processor-executable instructions, on execution, further cause the processor to determine belongingness of the input word to each of the plurality of existing domains based on the weighted overall similarity score.

In one embodiment, a non-transitory computer-readable medium storing computer-executable instructions for creating and building a domain dictionary is disclosed. In one example, the stored instructions, when executed by a processor, cause the processor to perform operations comprising computing a syntactic similarity score, a usage similarity score, and a contextual similarity score for an input word with respect to each of a plurality of domain specific words in each of a plurality of existing domains. The operations further comprise computing a weighted overall similarity score for the input word with respect to each of the plurality of domain specific words in each of the plurality of existing domains based on the syntactic similarity score, the usage similarity score, and the contextual similarity score. The operations further comprise determining belongingness of the input word to each of the plurality of existing domains based on the weighted overall similarity score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 depicts an exemplary score table for determining domain(s) for input word(s) in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
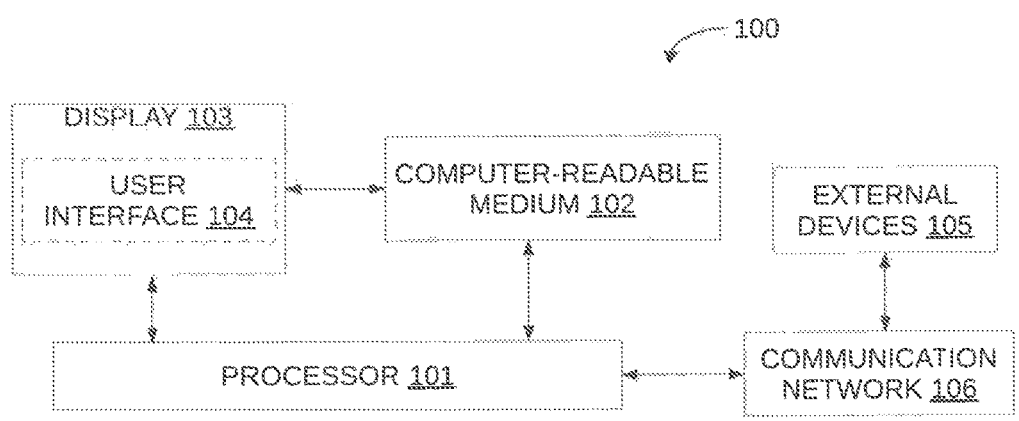
FIG. 1 is a block diagram of an exemplary system for creating and building a domain dictionary in accordance with some embodiments of the present disclosure.

Referring now to FIG. 1, an exemplary system 100 for creating and building a domain dictionary is illustrated in accordance with some embodiments of the present disclosure. In particular, the system 100 (e.g., laptop, netbook, or any other computing device) implements a domain dictionary creation and building (DDCB) engine for dynamically creating and building a domain dictionary. As will be described in greater detail in conjunction with FIG. 2, the DDCB engine comprises multiple modules configured to process input documents so as to create and build domain dictionary. The DDCB engine computes a syntactic similarity score, a usage similarity score, and a contextual similarity score for an input word with respect to each of a plurality of domain specific words in each of a plurality of existing domains. The DDCB engine then computes a weighted overall similarity score for the input word with respect to each of the plurality of domain specific words in each of the plurality of existing domains based on the syntactic similarity score, the usage similarity score, and the contextual similarity score. The DDCB engine then determines belongingness of the input word to each of the plurality of existing domains based on the weighted overall similarity score.

The system 100 comprises one or more processors 101, a computer-readable medium (e.g., a memory) 102, and a display 103. The computer-readable storage medium 102 stores instructions that, when executed by the one or more processors 101, cause the one or more processors 101 to dynamically create and build domain dictionary in accordance with aspects of the present disclosure. The computer-readable storage medium 102 may also store various data (e.g., input documents, extracted keywords, existing domain dictionary, unknown domain, various similarity scores, weights for each of the similarity scores, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
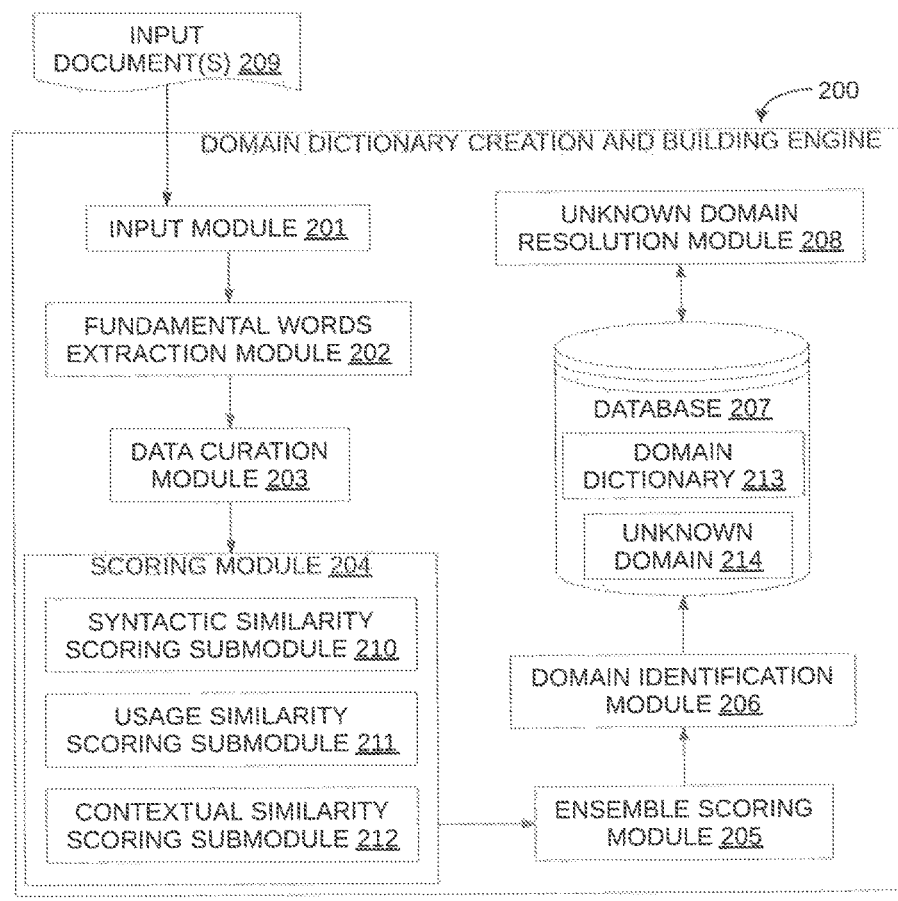
FIG. 2 is a functional block diagram of a domain dictionary creation and building engine in accordance with some embodiments of the present disclosure.

Referring now to FIG. 2, a functional block diagram of the DDCB engine 200 implemented by the system 100 of FIG. 1 is illustrated in accordance with some embodiments of the present disclosure. The DDCB engine 200 may include various modules that perform various functions so as to dynamically create and build domain dictionary. In some embodiments, the DDCB engine 200 comprises an input module 201, a fundamental words extraction module 202, a data curation module 203, a scoring module 204, an ensemble scoring module 205, a domain identification module 206, a database 207, and an unknown domain resolution module 208.

The input module 201 receives input documents 209 from a user via the user interface, an application (e.g., Adobe Acrobat, BOTs, MS Word, Internet Explorer, etc.), or another device (e.g., scanner, fax machine, computing device, etc.). As will be appreciated by those skilled in the art, the input documents 209 may be text documents or web pages from which the data may be extracted so as to create or build domain dictionary based on underlying contexts in accordance with aspects of the present disclosure. In some embodiments, the input module 201 may receive domain specific input documents from the user during initial supervised learning phase so as to pre-define domains and create basic domain dictionary. Subsequently, input module 201 may receive generic input documents during unsupervised operation phase or normal operation phase so as to build on the domain dictionary created during the supervised learning phase. In some embodiments, the input module 201 may also receive primary domain names definition from the user via the user interface. The input module 201 may also enable the user to change the domain names at any stage or to perform cognitive validation and correction during supervised learning as well as unsupervised operation phase.

The fundamental words extraction module 202 receives domain specific input documents for a given domain from the input module 201 during initial supervised learning phase. Additionally, in some embodiments, the fundamental words extraction module 202 may also receive a domain name pre-definition for the given domain from the input module 201 during initial supervised learning phase. The fundamental words extraction module 202 then parses the domain specific input documents, extracts data from the domain specific input documents, and curates the extracted data. Further, the fundamental words extraction module 202 extracts domain specific fundamental words (i.e., domain specific keywords) from the curated data and creates the fundamental dictionary for the given domain. In some embodiments, the creation of the fundamental dictionary for a given domain may be based on a contextual similarity score for each of the extracted domain specific input words as a parent word or a child word with respect to each of the remaining extracted domain specific input words. It should be noted that the fundamental words extraction module 202 may perform above discussed functions as a one time operation for each new domain.

The data curation module 203 parses the input documents, extracts data from the input documents, and curates the extracted data during unsupervised operation phase. As will be appreciated, data curation involves pre-processing the extracted data corpus by stemming, removing stop words, standardizing, and so forth. For example, the data curation module 203 may convert all the characters to a common case (either upper case or lower case), or standardize data formats (e.g., normalizing all text formats). Additionally, the data curation module 203 may remove spaces (e.g., extra or redundant white spaces), punctuations, and stop words (e.g., commonly occurring words like a, an, the, is, was, etc.) as they add little or no value to domain specific dictionary. Further, the data curation module 203 may perform stemming where different forms of same words (e.g., trying/tried/try, device/devices, utilization/utilizes/utilizing, etc.) may be represented by one word or root of the word (e.g., try, device, utilization, etc.). Further, the data curation module 203 may perform synsets creation so as to group semantically equivalent words or contextually similar synonyms. It should be noted that pre-processing may also involve other text processing techniques. The above mentioned tasks may be performed via WordNet or other similar tools.

The scoring module 204 receives the input keywords from the data curation module 203 and computes various similarity scores for each of the input keywords with respect to each of the words in existing domain dictionary. For example, in some embodiments, the scoring module 204 comprises a syntactic similarity scoring submodule 210, a usage similarity scoring submodule 211, and a contextual similarity scoring submodule 212. The syntactic similarity scoring submodule 210 computes the syntactic similarity score for each input keyword with respect to each word from all existing domain dictionaries based on their syntactical similarity. Similarly, the usage similarity scoring submodule 211 computes the usage similarity score for each input keyword with respect to each word from all existing domain dictionaries based on their usage similarity. The contextual similarity scoring submodule 212 computes the contextual similarity score for each input keyword with respect to each word from all existing domain dictionaries based on their contextual similarity. It should be noted that, in some embodiments, the scoring module 204 may include additional submodules for computing other similarity scores such as root based distance similarity score, weighted root based distance similarity score, subsequence based distance similarity score, and bag distance similarity score, and so forth. These may be added so as to improve efficiency and efficacy in specific scenarios depending on end usage or functional domain (e.g., legal, finance, insurance, Information Technology, etc.). Further, it should be noted that in some embodiments, the computation of similarity scores may be further improved by considering other dimensions such as time, location, action, cause, and so forth.

The ensemble scoring module 205 receives various similarity scores from each of the submodules of the scoring module 204 and computes overall similarity score for each of the input keywords with respect to each of the words in existing domain dictionary based on their respective similarity scores from each of the submodules of the scoring module 204. For example, in some embodiments, the ensemble scoring module 205 computes the overall similarity score for each of the input keywords with respect to each of the words in existing domain dictionary based on their syntactic similarity score, usage similarity score, and contextual similarity score. In some embodiments, the ensemble scoring module 205 computes the overall similarity score by computing weighted average of various similarity scores received from various submodules of the scoring module 204. It should be noted that the weights may be adaptive and may adjust over a period of time based on user's feedback on determining belongingness of the input keyword to the existing domains. Thus, the weights may be initially pre-defined by a user, but may subsequently adapt after reaching certain confidence level (e.g., correct identification of at least 50 words to their respective domains) based on user's input during cognitive validation and correction.

The domain identification module 206 identifies the domain to which the input keyword belongs based on its overall similarity score with respect to each of the words in existing domain dictionary. Thus, if the ensemble or overall similarity score of an input keyword with respect to a word in a particular domain is more than a pre-defined threshold score, then the input keyword may be considered to be belonging to that domain. Additionally, the overall similarity score of the same input keyword with respect to other words in that particular domain as well as with respect to other words in other domain may be considered and compared against the pre-defined threshold score so as to identify all the domains to which the input keyword belongs to. However, if the weighted overall similarity score for the input word with respect to each of the plurality of domain specific words in each of the plurality of existing domains is less than the pre-defined threshold score (i.e., if the word does not belong to any domain), then it is considered as belonging to an unknown domain. Further, if the word belongs to more than a pre-defined threshold number of domains, then also it is considered as belonging to an unknown domain.

The database 207 comprises domain dictionary database 213 and unknown domain database 214. Each of the keywords identified to be belonging to one or more domains are stored in the domain dictionary database 213. It should be noted that, in some embodiments, the keyword may be stored in an n-array tree of a particular domain dictionary. Further, as will be appreciated, there may be multiple n-array trees corresponding to multiple domains in the domain dictionary database 213. Additionally, the keywords considered as belonging to an unknown domain are stored in the unknown domain database 214 for subsequent resolution.

The unknown domain resolution module 208 performs resolution of keywords in the unknown domain database 214. The unknown domain resolution module 208 associates the words in unknown domain to correct domain by repeating the process of scoring and domain identification performed by modules 204-206. The unknown domain resolution module 208 initiates the process of resolution upon reaching a pre-defined threshold number of unresolved input words in the unknown domain database 214. Alternatively, the unknown domain resolution module 208 initiates the process of resolution at a pre-defined time interval, or upon an indication by a user. In other words, the unknown domain resolution module 208 repeats the process of scoring and domain identification performed by modules 204-206 after the DDCB engine 200 becomes a more learned model, so as to determine if the domain can be identified now for the keywords in the unknown domain database 214.

As will be appreciated by those skilled in the art, all such aforementioned modules and submodules may be represented as a single module or a combination of different modules. Further, as will be appreciated by those skilled in the art, each of the modules may reside, in whole or in parts, on one device or multiple devices in communication with each other.

As will be appreciated by one skilled in the art, a variety of processes may be employed for dynamically creating and building a domain dictionary. For example, the exemplary system 100 may create and build the domain dictionary by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
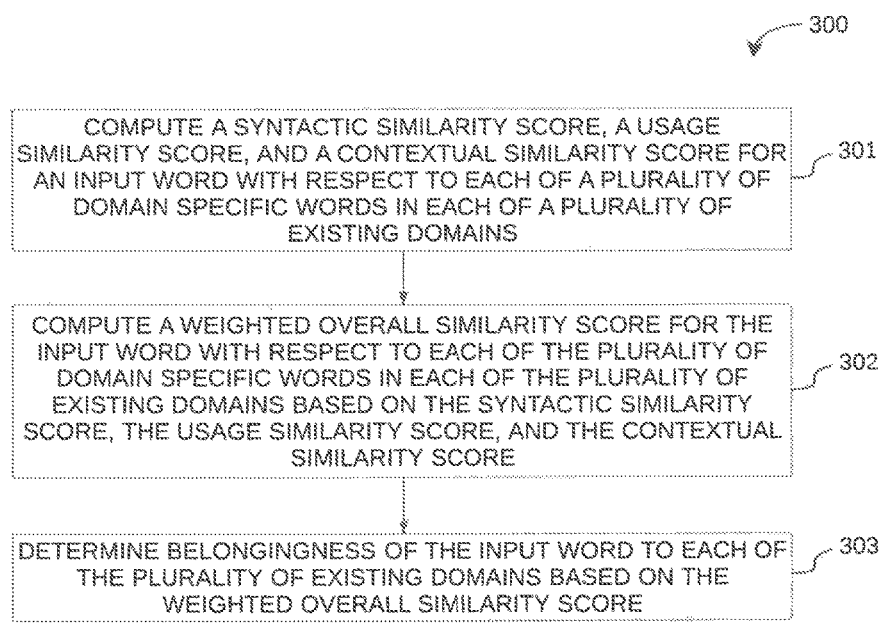
FIG. 3 is a flow diagram of an exemplary process for creating and building a domain dictionary in accordance with some embodiments of the present disclosure.

For example, referring now to FIG. 3, exemplary control logic 300 for dynamically creating and building a domain dictionary via a system, such as system 100, is depicted via a flowchart in accordance with some embodiments of the present disclosure. As illustrated in the flowchart, the control logic 300 includes the steps of computing a syntactic similarity score, a usage similarity score, and a contextual similarity score for an input word with respect to each of a plurality of domain specific words in each of a plurality of existing domains at step 301, computing a weighted overall similarity score for the input word with respect to each of the plurality of domain specific words in each of the plurality of existing domains based on the syntactic similarity score, the usage similarity score, and the contextual similarity score at step 302, and determining belongingness of the input word to each of the plurality of existing domains based on the weighted overall similarity score at step 303.

In some embodiments, the control logic 300 further includes the step of determining the input word from an input document by extracting a plurality of words from the input document, and curating the plurality of words to determine a plurality of input words. Additionally, in some embodiments, the control logic 300 includes the step of creating each of the plurality of existing domains comprising the plurality of domain specific words from a plurality of domain specific input documents. The step of creating each of the plurality of existing domain comprises extracting a plurality of words from the plurality of domain specific input documents for a given domain, curating the plurality of words to determine a plurality of domain specific input words, and computing a contextual similarity score for each of the plurality of domain specific input words as a parent word or a child word with respect to each of the plurality of remaining domain specific input words. The step of creating each of the plurality of existing domain further comprises determining a fuzzy membership value for each of the plurality of domain specific input words based on the corresponding contextual similarity score, and building an n-array tree of the plurality of domain specific input words for the given domain based on the fuzzy membership value for each of the plurality of domain specific input words.

In some embodiments, computing the syntactic similarity score for the input word with respect to each of the plurality of domain specific words in each of the plurality of existing domains at step 301 comprises determining a Jaro distance between the input word and the given domain specific word. Additionally, in some embodiments, computing the usage similarity score for the input word with respect to each of the plurality of domain specific words in each of the plurality of existing domains at step 301 comprises determining a ratio between a number of occurrence of the input word in a neighborhood of each of the plurality of domain specific words in each of the plurality of existing domains and a total number of occurrence of the input word. Further, in some embodiments, computing the contextual similarity score for the input word with respect to each of the plurality of domain specific words in each of the plurality of existing domains at step 301 comprises determining a ratio between a number of occurrence of the input word as a parent word or as a child word with respect to each of the plurality of domain specific words in each of the plurality of existing domains and a total number of occurrence of the input word.

In some embodiments, determining belongingness of the input word at step 303 comprises comparing the weighted overall similarity score for the input word with respect to each of the plurality of domain specific words in each of the plurality of existing domains with a pre-defined threshold score to determine one or more of the plurality of existing domains to which the input word belongs, and comparing a number of the one or more existing domains to which the input word belongs with a pre-defined threshold number of domains. Additionally, in some embodiments, the control logic 300 includes the step of categorizing the input word as an unresolved input word if the weighted overall similarity score for the input word with respect to each of the plurality of domain specific words in each of the plurality of existing domains is less than the pre-defined threshold score, or if the number of the one or more existing domains to which the input word belongs exceeds the pre-defined threshold number of domains. Further, in some embodiments, the control logic 300 includes the step of resolving a plurality of unresolved input words upon reaching a pre-defined threshold number of unresolved input words, or at a pre-defined time interval, or upon an indication by a user. Moreover, in some embodiments, the control logic 300 includes the step of providing the input word along with the one or more of the plurality of existing domains to which the input word belongs for cognitive validation and correction. In some embodiments, the control logic 300 further includes the step of building an n-array tree for each of the one or more of the plurality of existing domains to which the input word belongs.

Figure 4:
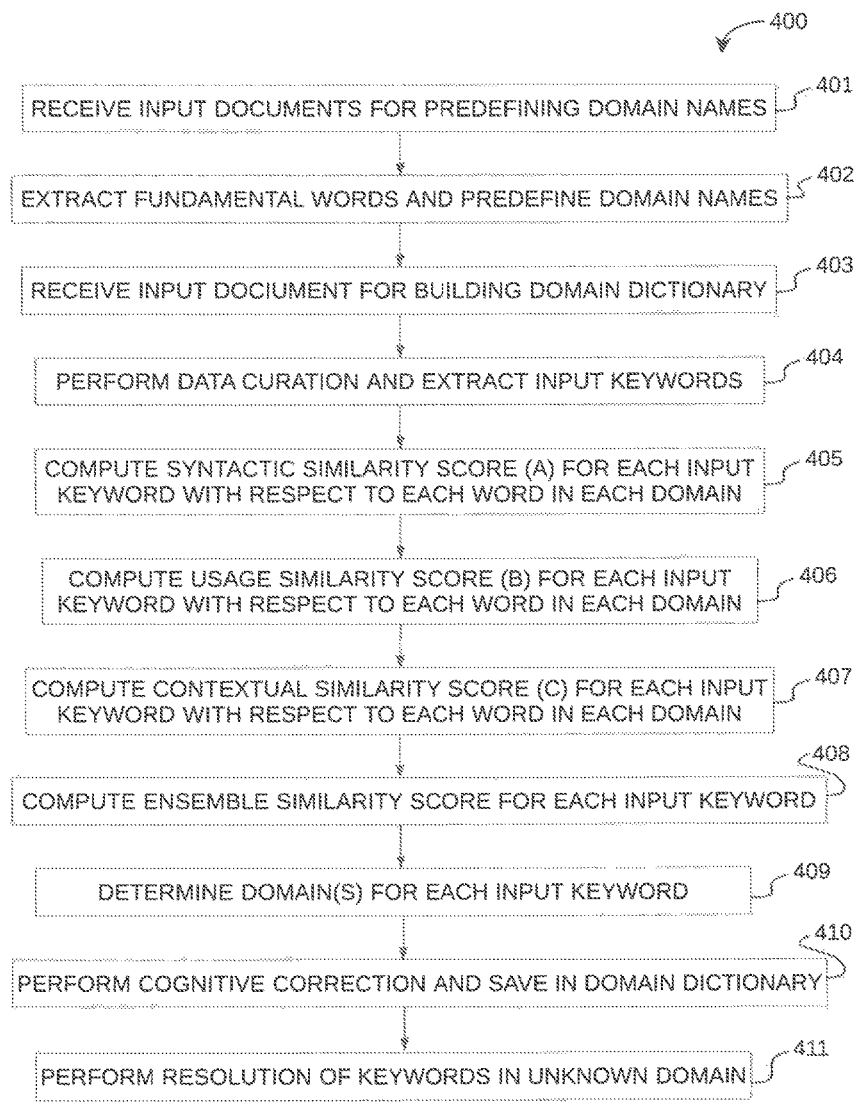
FIG. 4 is a flow diagram of a detailed exemplary process for creating and building a domain dictionary in accordance with some embodiments of the present disclosure.

Referring now to FIG. 4, exemplary control logic 400 for dynamically creating and building a domain dictionary is depicted in greater detail via a flowchart in accordance with some embodiments of the present disclosure. As illustrated in the flowchart, the control logic 400 includes the step of receiving input documents for predefining domain names at step 401. As will be appreciated, the domain dictionary is empty initially. The user provides domain specific documents for creating the fundamental dictionary as a part of supervised learning.

The control logic 400 further includes the step of creating fundamental domain name dictionaries by extracting fundamental words and predefining domain names at step 402. The step 402 includes parsing the domain specific input documents and extracting the text from the same. The extracted text is then tokenized and curated using standard techniques discussed above (such as removing stop words, stemming, creating synsets, etc.) so as to determine fundamental words or domain specific input words. The step 402 further includes comparing each of the plurality of domain specific input words with each of the plurality of remaining domain specific input words based on contextual similarity score. It should be noted that, in some embodiments, the contextual similarity score may be computed for each of the plurality of domain specific input words as a parent word or a child word with respect to each of the plurality of remaining domain specific input words. For example, contextual similarity score between two words 'x' and 'y' ($CS_{x,y}$) may be computed as depicted in equation (1):

$$CS_{x,y} = N_{x,y}/N_x \quad (1)$$

where, $N_{x,y}$ is number of occurrences of word 'x' as a parent word (or a child word) of word 'y', and
$N_x$ is number of occurrences of word 'x' in the input document.

In some embodiments, an n-array tree with a threshold value of all the domain specific input words (i.e., fundamental words) for the given domain is created or built based on the context similarity score for each parent and child pair where the level-1 word is a user provided domain name. As stated above, the user may change the domain name at any stage. Further, it should be noted that, in some embodiments, a fuzzy membership value may be determined for each of the plurality of domain specific input words based on the corresponding contextual similarity score using a linear scale while creating or building the n-array tree.

Figure 5:
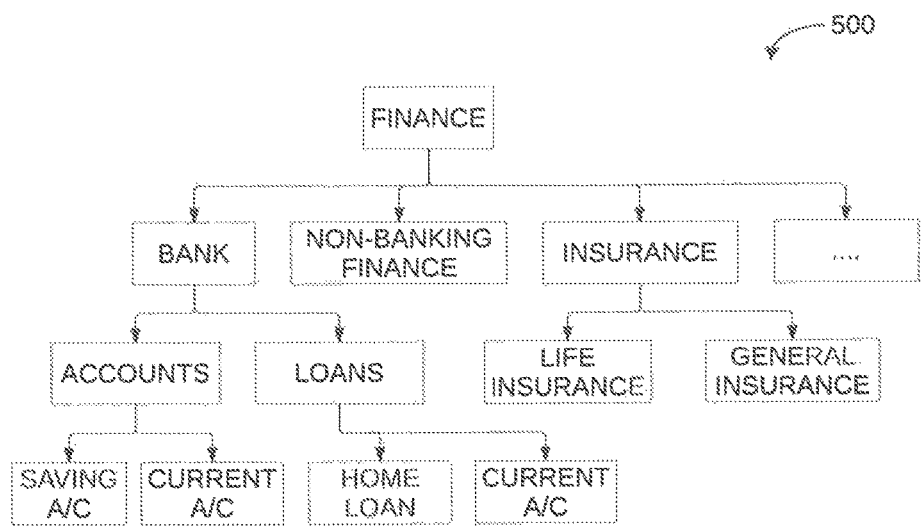
FIG. 5 depicts an exemplary n-array tree in accordance with some embodiments of the present disclosure.

Referring now to FIG. 5, an exemplary n-array tree 500 for finance domain (i.e., Level 1 domain defined by the user) is illustrated in accordance with some embodiments of the present disclosure. The n-array tree 500 for finance domain may be derived using domain-specific input documents (e.g., user provided articles or journals related to finance) via the DDCB engine 200 as described above. As illustrated, 'Bank', 'Insurance', 'Non-Banking Finance', etc. become sub-domain names at Level-2 from Level-1 node. Similarly, various further sub-domains may be created at Level-3 from Level-2 nodes and so forth.

Referring back to FIG. 4, the control logic 400 further includes the step of receiving input documents for building domain dictionary as a part of unsupervised learning at step 403. As will be appreciated, the domain dictionary needs to be continuously built. The engine receives an input document (which may not be domain specific), extracts input words (i.e., keywords) from the input document, and adds to the corresponding domain.

The control logic 400 further includes the step of performing data curation and extracting input keywords from the input document at step 404. The step 404 includes parsing the input documents and extracting the text from the same. The extracted text is then tokenized and curated using standard techniques discussed above (such as removing stop words, stemming, creating synsets, etc.) so as to determine input words or keywords.

Figure 6:
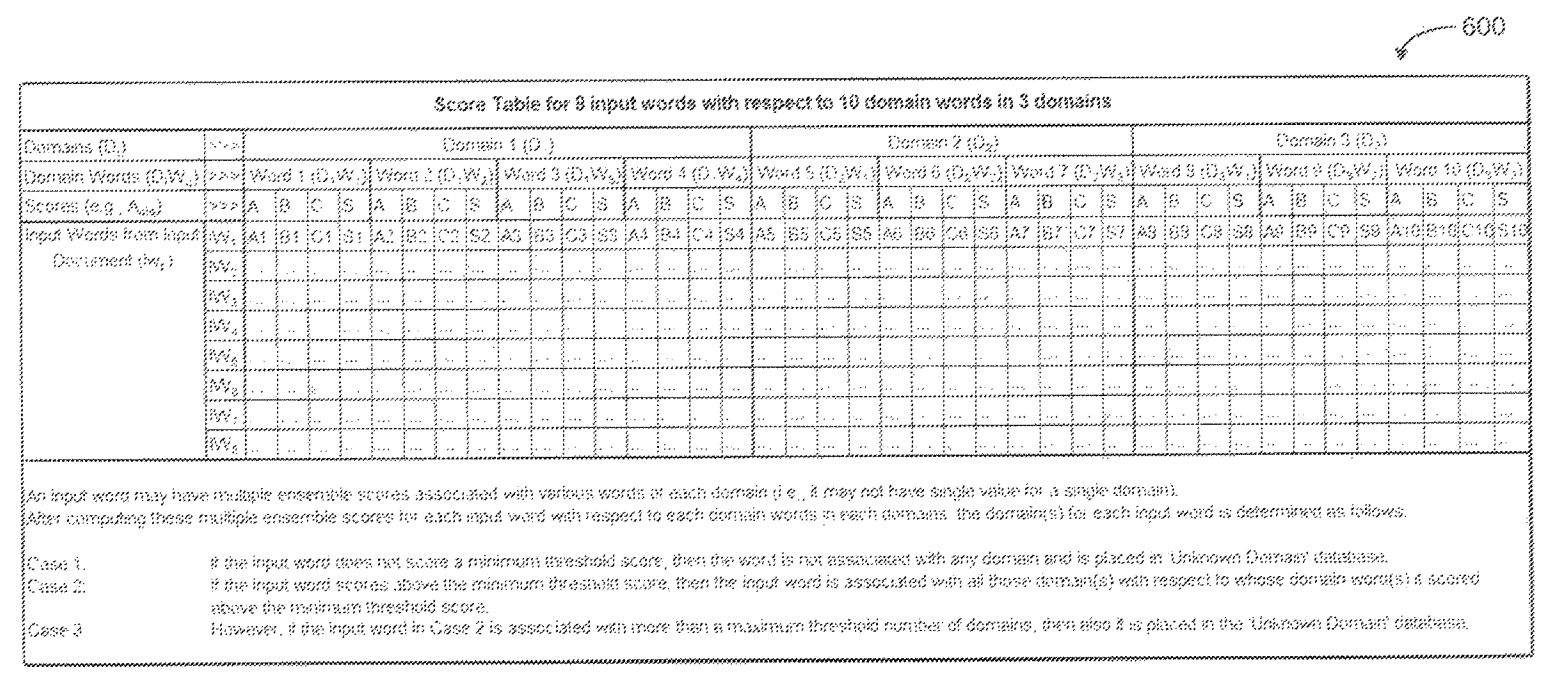

Referring now to FIG. 4 and FIG. 6, upon determination of input keywords, the control logic 400 includes the step of comparing each of the plurality of input words (say, $IW_p$, p=1 to m) with each of the plurality of domain specific words (say, $D_iW_q$, q=1 to n) in each of a plurality of existing domains (say, $D_i$, i=1 to z) based on a syntactic similarity, a usage similarity, and a contextual similarity. Thus, the control logic 400 includes the steps of computing a syntactic similarity score (A), a usage similarity score (B), and a contextual similarity score (C) for each input word with respect to each domain specific word in each existing domain at steps 405, 406, and 407. These score are subsequently used to compute ensemble or overall similarity score (S) as will be discussed in greater detail below.

It should be noted that if two words are syntactically same then they belong to same domain. In other words, if word 'x' and word 'y' are syntactically same and 'x' belongs to D1 domain, then 'y' also belongs to D1 domain as well. The syntactic similarity score between two words 'x' and 'y' ($SS_{x,y}$) may be computed as depicted in equation (2):

$$SS_{x,y} = J_{x,y} + L \times 0.1(1 - J_{x,y}) \quad (2)$$

where, $J_{x,y}$ is Jaro distance between 'x' and 'y', and
L=Length of common prefix at the start of string up to a maximum of 4 character.

Similarly, it should be noted that if two words have similarity of neighborhood words (i.e. they are used in substantially similar phrases or same phrases) then they belong to same domain. In other words, if word 'x' and word 'y' are used in same phrase P1 or substantially similar phrases P1 and P2 and 'x' belongs to D1 domain, then 'y' belongs to D1 domain as well. The usage similarity score between two words 'x' and 'y' may be computed as depicted in equation (3):

$$US_{x,y} = K_{x,y} / K_x \quad (3)$$

where, $K_{x,y}$ is number of occurrences of word 'x' in a neighborhood of word 'y', and
$K_x$ is number of occurrences of word 'x' in the input document.

Further, it should be noted that if there is a parent and child relationship between two words there is contextual similarity between them. Thus, as discussed above, the contextual similarity score ($CS_{x,y}$) between two words 'x' and 'y' may be computed in accordance with equation (1).

The control logic 400 further includes the step of computing ensemble or overall similarity score for each input word with respect to each domain specific word in each existing domain at step 408. In some embodiments, the ensemble or overall similarity score (S) of each input word with respect to each domain specific word in each existing domain is computed based on the syntactic similarity score (A), the usage similarity score (B), and the contextual similarity score (C) of the corresponding input word with respect to each domain specific word in each existing domain. In some embodiments, the ensemble similarity score between two words 'x' and 'y' ($ES_{x,y}$) may be computed as depicted in equation (4):

$$ES_{x,y} = W_s \times SS_{x,y} + W_u \times US_{x,y} + W_c \times CS_{x,y} \quad (4)$$

where, $W_s$ is weightage for syntax similarity,
$W_u$ is weightage for usage similarity, and
$W_c$ is weightage for context similarity.

As stated above, the weightage may be adaptive in nature. It may be initially provisioned by the user but may subsequently adapt after reaching certain confidence level based on user's validation. In some embodiments, a fuzzy membership value may be determined for each of the syntactic similarity score (A), the usage similarity score (B), and the contextual similarity score (C) using a linear scale for computing the final ensemble similarity score (S). As will be appreciated, the creation and building of domain dictionary is based on the statistical values (i.e., ensemble scores) and is therefore language independent. In other words, the present invention may be applied to dynamically create and build domain dictionary independent of the language.

The control logic 400 further includes the step of determining one or more domains for each input keywords at step 409. For example, after computing the ensemble or overall similarity score for each input word with respect to each domain word in each domain, one or more domains may be identified for the input words as mentioned herein below.

First, if the ensemble similarity score for an input word with respect to any of the domain specific word in any of the domain is below a pre-defined minimum threshold ensemble similarity score, then the word is not associated with any domain and is placed in the unknown domain database. However, if the ensemble similarity score for an input word with respect to any of the domain specific word in any of the domain is above the pre-defined minimum threshold ensemble similarity score then the input word is associated with those domains. Second, if the input word is associated with more than a pre-defined maximum threshold number of domains, then also the word is not associated with any domain and is categorized as 'unknown domain' and placed in the unknown domain database. Thus, it should be noted that an input word may be associated to more than one domain but less than the pre-defined maximum threshold number of domains. For example, if any input word belongs to more than one domain but less than threshold number of domains, then it will be associated with all such domains.

The above described process may be represented with the help of following algorithm:

---

For each input word in input document $IW_p$ (p = 1 to m),
   For each domain $D_i$ (i = 1 to z),
     For each domain word in domain $D_iW_q$ (q = 1 to n),
       Compute the Syntactic Similarity score $SS_{piq}$ ($A_{piq}$);
       Compute the Usage Similarity score $US_{piq}$ ($B_{piq}$);
       Compute the Contextual Similarity score $CS_{piq}$ ($C_{piq}$);
       Compute the Ensemble Similarity score $ES_{piq}$ ($S_{piq}$);
     Next domain Word DW;
   Next domain D;
Next Input Word W;
Compare the ensemble similarity score ($S_{piq}$) for each input word with respect to each domain word in each domain, and decide the domain.

---

Once automatic domain creation or building is completed, a manual confirmation and correction wherever required may be performed. The control logic 400 therefore includes the step of performing cognitive validation and correction at step 410 and saving the word either in domain dictionary database or unknown domain database based on user inputs.

The control logic 400 further includes the step of performing resolution of keywords in the unknown domain database at step 411. This step involves associating the words in unknown domain to correct domain by recalculating the ensemble score for each of the word in the unknown domain database with respect to each domain specific word in each domain, and determining one or more domains for each keywords based on the ensemble score. The step 411 may be initiated automatically upon accumulating a pre-defined threshold number of unresolved input words in the unknown domain database, or at a pre-defined time interval (i.e, as a scheduled service). Alternatively, the step 411 may be initiated upon an indication by a user.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide for dynamic creation and building of domain dictionaries from varied information sources like documents, web pages, and so forth. In other words, the techniques provide for automatic creation and enrichment of ontology with domain specific knowledge. The techniques employ text mining techniques (especially mining the domain specific texts and glossaries/dictionaries) in order to find groups of concepts/terms which are related to each other. Such groups of related concepts/terms may then enable the techniques to either, update the existing ontology in case those concepts are already defined in the ontology, or to enrich the existing ontology in case those concepts are not defined.

Additionally, the techniques described above are language independent and may therefore be easily applied to create and build domain dictionaries in different languages. Further, as will be appreciated by those skilled in the art, the techniques described in the various embodiments discussed above provide for fuzzy based construction of domain dictionary by measuring similarity score between fundamental words of discovered domain and new keywords to be categorized. Further, the techniques described in the various embodiments discussed above provide for dynamic resolution of words determined as belonging to unknown domain (i.e., words which showed unclear association with one or more domains). Such resolution may be automatic when number of words in unknown domain reaches a threshold value, or when a pre-defined time interval has elapsed.

As will be appreciated by those skilled in the art, the domain specific dictionaries may be useful in multiple solutions such as document classification, machine translation, and other natural language processing (NLP) tasks. Further, the domain specific dictionaries may be effectively used for various purposes such as topic specific frequently asked questions (FAQs), information retrieval or searching, finding areas of interest, and so forth. Moreover, the domain specific dictionaries enable natural classification of words as it contains domain information.

The specification has described system and method for dynamically creating and building of language independent domain dictionaries. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented method for creating and building a domain dictionary, the method comprising:
   computing, by a hardware processor, a syntactic similarity score, a usage similarity score, and a contextual similarity score for an input word with respect to each of a plurality of domain specific words in each of a plurality of existing domains;
   computing, by the hardware processor, a weighted overall similarity score for the input word with respect to each of the plurality of domain specific words in each of the plurality of existing domains based on the syntactic similarity score, the usage similarity score, and the contextual similarity score;
   determining, by the hardware processor, belongingness of the input word to each of the plurality of existing domains based on the weighted overall similarity score;

categorizing, by the hardware processor, the input word as an unresolved input word based on the weighted overall similarity score and a number of the plurality of existing domains to which the input word belongs, wherein the unresolved input word has unclear association with the plurality of existing domains; and automatically resolving, by the hardware processor, a plurality of unresolved input words by associating each of the plurality of unresolved input words with a correct domain.

2. The method of claim 1, further comprising determining the input word from an input document by:

extracting a plurality of words from the input document; and curating the plurality of words to determine a plurality of input words.

3. The method of claim 1, further comprising creating each of the plurality of existing domains comprising the plurality of domain specific words from a plurality of domain specific input documents by:

extracting a plurality of words from the plurality of domain specific input documents for a given domain;

curating the plurality of words to determine a plurality of domain specific input words;

computing a contextual similarity score for each of the plurality of domain specific input words as a parent word or a child word with respect to each of a plurality of remaining domain specific input words;

determining a fuzzy membership value for each of the plurality of domain specific input words based on a corresponding contextual similarity score; and building an n-array tree of the plurality of domain specific input words for the given domain based on the fuzzy membership value for each of the plurality of domain specific input words.

4. The method of claim 1, wherein computing the syntactic similarity score for the input word with respect to each of the plurality of domain specific words in each of the plurality of existing domains comprises determining a Jaro distance between the input word and a given domain specific word.

5. The method of claim 1, wherein computing the usage similarity score for the input word with respect to each of the plurality of domain specific words in each of the plurality of existing domains comprises determining a ratio between a number of occurrence of the input word in a neighborhood of each of the plurality of domain specific words in each of the plurality of existing domains and a total number of occurrence of the input word.

6. The method of claim 1, wherein computing the contextual similarity score for the input word with respect to each of the plurality of domain specific words in each of the plurality of existing domains comprises determining a ratio between a number of occurrence of the input word as a parent word or as a child word with respect to each of the plurality of domain specific words in each of the plurality of existing domains and a total number of occurrence of the input word.

7. The method of claim 1, wherein determining belongingness of the input word comprises:

comparing the weighted overall similarity score for the input word with respect to each of the plurality of domain specific words in each of the plurality of existing domains with a pre-defined threshold score to determine one or more of the plurality of existing domains to which the input word belongs; and comparing a number of the one or more of the plurality of existing domains to which the input word belongs with a pre-defined threshold number of domains.

8. The method of claim 7, further comprising categorizing the input word as the unresolved input word if:

the weighted overall similarity score for the input word with respect to each of the plurality of domain specific words in each of the plurality of existing domains is less than the pre-defined threshold score; or the number of the one or more of the plurality of existing domains to which the input word belongs exceeds the pre-defined threshold number of domains.

9. The method of claim 8, further comprising resolving the plurality of unresolved input words upon reaching a pre-defined threshold number of unresolved input words, or at a pre-defined time interval, or upon an indication by a user.

10. The method of claim 7, further comprising providing the input word along with the one or more of the plurality of existing domains to which the input word belongs for cognitive validation and correction.

11. The method of claim 7, further comprising building an n-array tree for each of the one or more of the plurality of existing domains to which the input word belongs.

12. A system for creating and building a domain dictionary, the system comprising:

at least one hardware processor; and a memory for storing instructions that, when executed by the at least one hardware processor, cause the at least one hardware processor to perform operations comprising:

computing a syntactic similarity score, a usage similarity score, and a contextual similarity score for an input word with respect to each of a plurality of domain specific words in each of a plurality of existing domains;

computing a weighted overall similarity score for the input word with respect to each of the plurality of domain specific words in each of the plurality of existing domains based on the syntactic similarity score, the usage similarity score, and the contextual similarity score;

determining belongingness of the input word to each of the plurality of existing domains based on the weighted overall similarity score;

categorizing the input word as an unresolved input word based on the weighted overall similarity score and a number of the plurality of existing domains to which the input word belongs, wherein the unresolved input word has unclear association with the plurality of existing domains; and automatically resolving a plurality of unresolved input words by associating each of the plurality of unresolved input words with a correct domain.

13. The system of claim 12, wherein the operations further comprise determining the input word from an input document by:

extracting a plurality of words from the input document; and curating the plurality of words to determine a plurality of input words.

14. The system of claim 12, wherein the operations further comprise creating each of the plurality of existing domains comprising the plurality of domain specific words from a plurality of domain specific input documents by:

extracting a plurality of words from the plurality of domain specific input documents for a given domain;

curating the plurality of words to determine a plurality of domain specific input words;
computing a contextual similarity score for each of the plurality of domain specific input words as a parent word or a child word with respect to each of a plurality of remaining domain specific input words;
determining a fuzzy membership value for each of the plurality of domain specific input words based on a corresponding contextual similarity score; and
building an n-array tree of the plurality of domain specific input words for the given domain based on the fuzzy membership value for each of the plurality of domain specific input words.

15. The system of claim 12, wherein determining belongingness of the input word comprises:
comparing the weighted overall similarity score for the input word with respect to each of the plurality of domain specific words in each of the plurality of existing domains with a pre-defined threshold score to determine one or more of the plurality of existing domains to which the input word belongs; and
comparing the number of the one or more of the plurality of existing domains to which the input word belongs with a pre-defined threshold number of domains.

16. The system of claim 15, wherein the operations further comprise:
categorizing the input word as the unresolved input word if:
the weighted overall similarity score for the input word with respect to each of the plurality of domain specific words in each of the plurality of existing domains is less than the pre-defined threshold score; or
the number of the one or more of the plurality of existing domains to which the input word belongs exceeds the pre-defined threshold number of domains; and
resolving the plurality of unresolved input words upon reaching a pre-defined threshold number of unresolved input words, or at a pre-defined time interval, or upon an indication by a user.

17. The system of claim 15, wherein the operations further comprise:
providing the input word along with the one or more of the plurality of existing domains to which the input word belongs for cognitive validation and correction; and
building an n-array tree for each of the one or more of the plurality of existing domains to which the input word belongs.

18. A non-transitory computer-readable medium storing instructions for creating and building a domain dictionary, wherein upon execution of the instructions by one or more hardware processors, the hardware processors perform operations comprising:
computing a syntactic similarity score, a usage similarity score, and a contextual similarity score for an input word with respect to each of a plurality of domain specific words in each of a plurality of existing domains;
computing a weighted overall similarity score for the input word with respect to each of the plurality of domain specific words in each of the plurality of existing domains based on the syntactic similarity score, the usage similarity score, and the contextual similarity score;
determining belongingness of the input word to each of the plurality of existing domains based on the weighted overall similarity score;
categorizing the input word as an unresolved input word based on the weighted overall similarity score and a number of the plurality of existing domains to which the input word belongs, wherein the unresolved input word has unclear association with the plurality of existing domains; and
automatically resolving a plurality of unresolved input words by associating each of the plurality of unresolved input words with a correct domain.

19. The non-transitory computer-readable medium of claim 18, wherein the operations further comprise creating each of the plurality of existing domains comprising the plurality of domain specific words from a plurality of domain specific input documents by:
extracting a plurality of words from the plurality of domain specific input documents for a given domain;
curating the plurality of words to determine a plurality of domain specific input words;
computing a contextual similarity score for each of the plurality of domain specific input words as a parent word or a child word with respect to each of a plurality of remaining domain specific input words;
determining a fuzzy membership value for each of the plurality of domain specific input words based on a corresponding contextual similarity score; and
building an n-array tree of the plurality of domain specific input words for the given domain based on the fuzzy membership value for each of the plurality of domain specific input words.

20. The non-transitory computer-readable medium of claim 18, wherein determining belongingness of the input word comprises:
comparing the weighted overall similarity score for the input word with respect to each of the plurality of domain specific words in each of the plurality of existing domains with a pre-defined threshold score to determine one or more of the plurality of existing domains to which the input word belongs;
comparing the number of the one or more of the plurality of existing domains to which the input word belongs with a pre-defined threshold number of domains;
categorizing the input word as the unresolved input word if:
the weighted overall similarity score for the input word with respect to each of the plurality of domain specific words in each of the plurality of existing domains is less than the pre-defined threshold score; or
the number of the one or more of the plurality of existing domains to which the input word belongs exceeds the pre-defined threshold number of domains; and
resolving the plurality of unresolved input words upon reaching a pre-defined threshold number of unresolved input words, or at a pre-defined time interval.

* * * * *